United States Patent
DeSota et al.

(10) Patent No.: US 7,089,372 B2
(45) Date of Patent: Aug. 8, 2006

(54) LOCAL REGION TABLE FOR STORAGE OF INFORMATION REGARDING MEMORY ACCESS BY OTHER NODES

(75) Inventors: Donald R. DeSota, Portland, OR (US); William Durr, Forest Grove, OR (US); Robert Joersz, Portland, OR (US); Davis A. Miller, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 10/725,853

(22) Filed: Dec. 1, 2003

(65) Prior Publication Data

US 2005/0120183 A1    Jun. 2, 2005

(51) Int. Cl.
*G06F 12/00* (2006.01)
*G06F 13/00* (2006.01)

(52) U.S. Cl. .................. 711/144; 711/145; 711/147; 711/120

(58) Field of Classification Search .................. None
See application file for complete search history.

(56) References Cited

U.S. PATENT DOCUMENTS

| | | | |
|---|---|---|---|
| 5,829,052 A * | 10/1998 | Pawlowski et al. ......... | 711/147 |
| 6,088,769 A * | 7/2000 | Luick et al. ................. | 711/141 |
| 6,275,900 B1 * | 8/2001 | Liberty ........................ | 711/120 |
| 6,651,157 B1 * | 11/2003 | Galles et al. ................. | 712/28 |
| 6,950,913 B1 * | 9/2005 | Glasco ........................ | 711/152 |
| 2001/0034816 A1 * | 10/2001 | Michael et al. ............. | 711/119 |
| 2002/0095554 A1 * | 7/2002 | McCrory et al. ........... | 711/144 |
| 2003/0009634 A1 * | 1/2003 | Arimilli et al. ............. | 711/141 |

* cited by examiner

*Primary Examiner*—Matthew Kim
*Assistant Examiner*—Michael Krofcheck
(74) *Attorney, Agent, or Firm*—Abdy Raissinia

(57) ABSTRACT

Information regarding memory access by other nodes within a coherency controller of a node is locally stored. The coherency controller receives a transaction relating a line of local memory of the node. In response to locally determining that the line of the local memory is not being cached by another node and/or has not been modified by another node, the coherency controller processes the transaction without accessing tag directory information regarding the line. A table within the controller may store entries corresponding to local memory sections. Each entry includes a count value tracking a number of lines of the section being cached by other nodes, and a count value tracking a number of lines of the section that have been modified by other nodes. The table may also include flags corresponding to the sections, each flag indicating the validity of the section's contents.

15 Claims, 6 Drawing Sheets

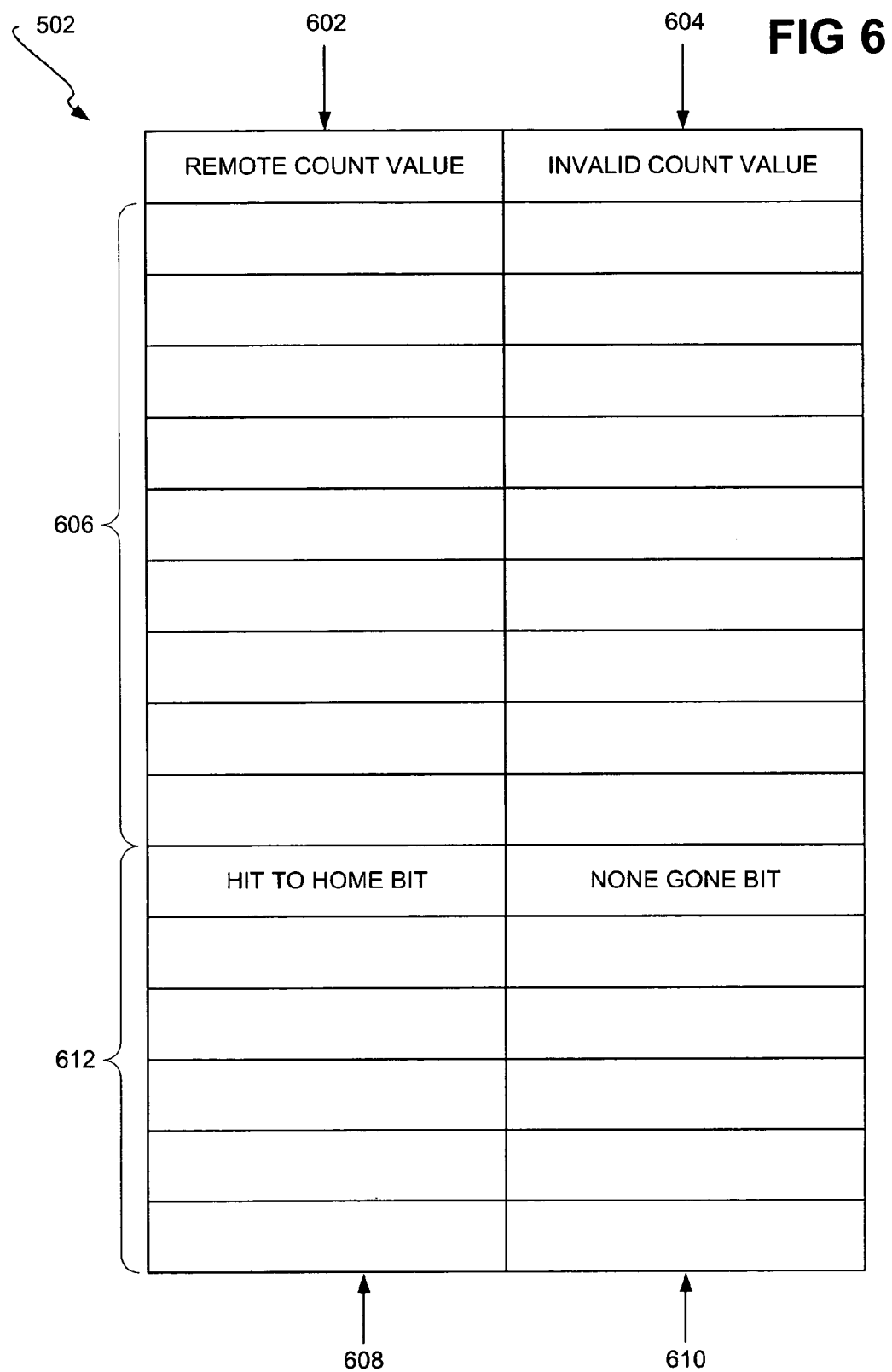

LOCAL REGION TABLE FOR STORAGE OF INFORMATION REGARDING MEMORY ACCESS BY OTHER NODES

BACKGROUND OF THE INVENTION

1. Technical Field

This invention relates generally to processing local memory-related transactions within a node of a cache coherent non-uniform memory access (NUMA) system, and more particularly to processing such transactions in which information regarding the access of the local memory by other nodes is needed.

2. Description of the Prior Art

There are many different types of multi-processor computer systems. A Symmetric Multi-Processor (SMP) system includes a number of processors that share a common memory. SMP systems provide scalability for multithreaded applications and allow multiple threads to run simultaneously. As needs dictate, additional processors, memory or IO can be added. SMP systems usually range from two to 128 or more processors. One processor generally boots the system and loads the SMP operating system, which brings the other processors online. Without partitioning, there is only one instance of the operating system in memory. Since all processors access the same memory, sharing of data can be accomplished simply by placing the data in memory. The operating system uses the processors as a pool of processing resources, all executing simultaneously, where each processor either processes data or is in an idle loop waiting to perform a task. SMP system throughput increases whenever processes can be overlapped until all processors are fully utilized.

A Massively Parallel Processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. The problem must be broken down with nodes explicitly communicating shared information via a message passing interface over the interconnect. For example, in scientific environments, certain simulations and mathematical problems can be split apart and each part processed at the same time.

A non-uniform memory access (NUMA) system is a multi-processing system in which memory is separated into distinct banks. NUMA systems are a type of SMP systems. In uniform memory access (UMA)-SMP systems, all processors access a common memory at the same speed. NUMA systems are usually broken up into nodes, or building blocks, containing one to eight, or more, processors. The nodes typically also contain a portion of the global memory. The memory local to a node typically is closer than memory in more distant parts of the system, in both physical and logical proximity, and thus is accessed faster. That is, local memory is accessed faster than distant shared memory. NUMA systems generally scale better to higher numbers of processors than UMA-SMP systems, due to the distribution of memory causing less contention in the memory controller.

Each building block, or node, typically caches the distant shared, or remote, memory to improve memory access performance either in cache memory internal to the processor or in node-level cache memories. The node where the memory resides is referred to as the home node. A coherency controller within the home node is used to track what copy of the line of memory is valid, the copy in memory or the copy in a remote cache memory, and where copies of the memory line are cached. A line of memory, or a memory line, is generally considered one or more memory locations within the memory that are capable of storing data. A line of memory may, for instance, correspond to one or more bytes of memory, or one or more words of memory.

The coherency controller ensures that the correct copy of a line is accessed and cached copies are kept up to date. The coherency controller may issue operations for a cache memory line to effect a transaction request. The coherency controller transmits operations to remote coherency controllers to read or invalidate copies of the line of memory that is being cached, as well as reads data from local memory when needed. To prevent needless data regarding the remote caching of the local memory being constantly sent among the nodes, such data is stored at the home node for the local memory, in what is referred to as a directory. That is, without a directory, the home node would have to poll every other node in the system to determine whether the home node's local memory is being remotely cached by these other nodes, which can cause significant traffic on the interconnect connecting the nodes to one another. Having a directory within the home node that stores information regarding whether the other nodes are remotely caching the home node's local memory means that the home node does not have to constantly poll the other nodes of the system to determine the caching status of the home node's local memory.

The directory can either be a full directory where each line in memory has a directory entry, or a sparse directory where each directory entry can store caching information regarding one of a number of different memory lines, such that the directory is considered a cache of directory entries. In a sparse directory there is a tag entry within the directory cache memory for each cache memory location within the directory cache memory. The tag entry may indicate, for instance, what memory location is being cached at its corresponding cache memory location, what other nodes are caching the memory location in their cache memories, and the status of the cache memory location. For performance reasons, directories are usually constructed from fast memory. This is so that memory accesses throughout the system are not unduly slowed.

However, the utilization of even fast tag memory can slow down processing of memory-related transactions within a node. Processing of such transactions usually occurs within a coherency controller of the node. The coherency controller of the node has to access the directory, which may be located outside of the controller, or implemented within embedded memory of the coherency controller, in order to process a given memory-related transaction. Even where the tag memory is fast and embedded within the coherency controller, transaction processing time is lengthened because the controller cannot complete the processing until the directory access is completed. For these and other reasons, therefore, there is a need for the present invention.

SUMMARY OF THE INVENTION

The invention relates to the local storage of information regarding memory access by other nodes within a coherency controller of a node. The coherency controller of the node performs a method of an embodiment of the invention. The coherency controller receives a transaction relating to a line of local memory of the node. In response to determining locally within the controller that the line of the local memory is not being cached by another node, has not been modified by another node, and/or is valid as stored by the node, the controller processes the transaction without accessing information regarding the line of local memory in a tag directory.

A node of a multi-node system of an embodiment of the invention includes one or more processors, local random-access memory (RAM) for the processors, at least one coherency controller to process transactions relative to the local RAM, a memory controller, and a local region table within the coherency controller. The coherency controller stores access information regarding the local RAM by other nodes of the multi-node system in a directory. The local region table stores access information for regions of local memory. These regions on memory may encompass multiple lines of memory. The coherency controller may thus be able to process the transactions relative to the local RAM without accessing directory information.

A coherency controller for a node of a system of an embodiment of the invention to process transactions relative to at least a portion of memory of the node includes a coherency processor and a local region table. Transactions are converted within the coherency processor into performable actions to effect the transactions relative to at least the portion of the memory of the node. The local region table stores access information regarding regions of at least the portion of the memory of the node by other nodes of the system, so that the coherency controller may be able to convert the transactions within the coherency processor without accessing directory information.

Other features and advantages of the invention will become apparent from the following detailed description of the presently preferred embodiment of the invention, taken in conjunction with the accompanying drawings.

BRIEF DESCRIPTION OF THE DRAWINGS

FIG. 6 is a diagram of the local region table of the coherency controller of FIG. 5 in more detail, according to an embodiment of the invention.

DESCRIPTION OF THE PREFERRED EMBODIMENT

Overview

Figure 1:
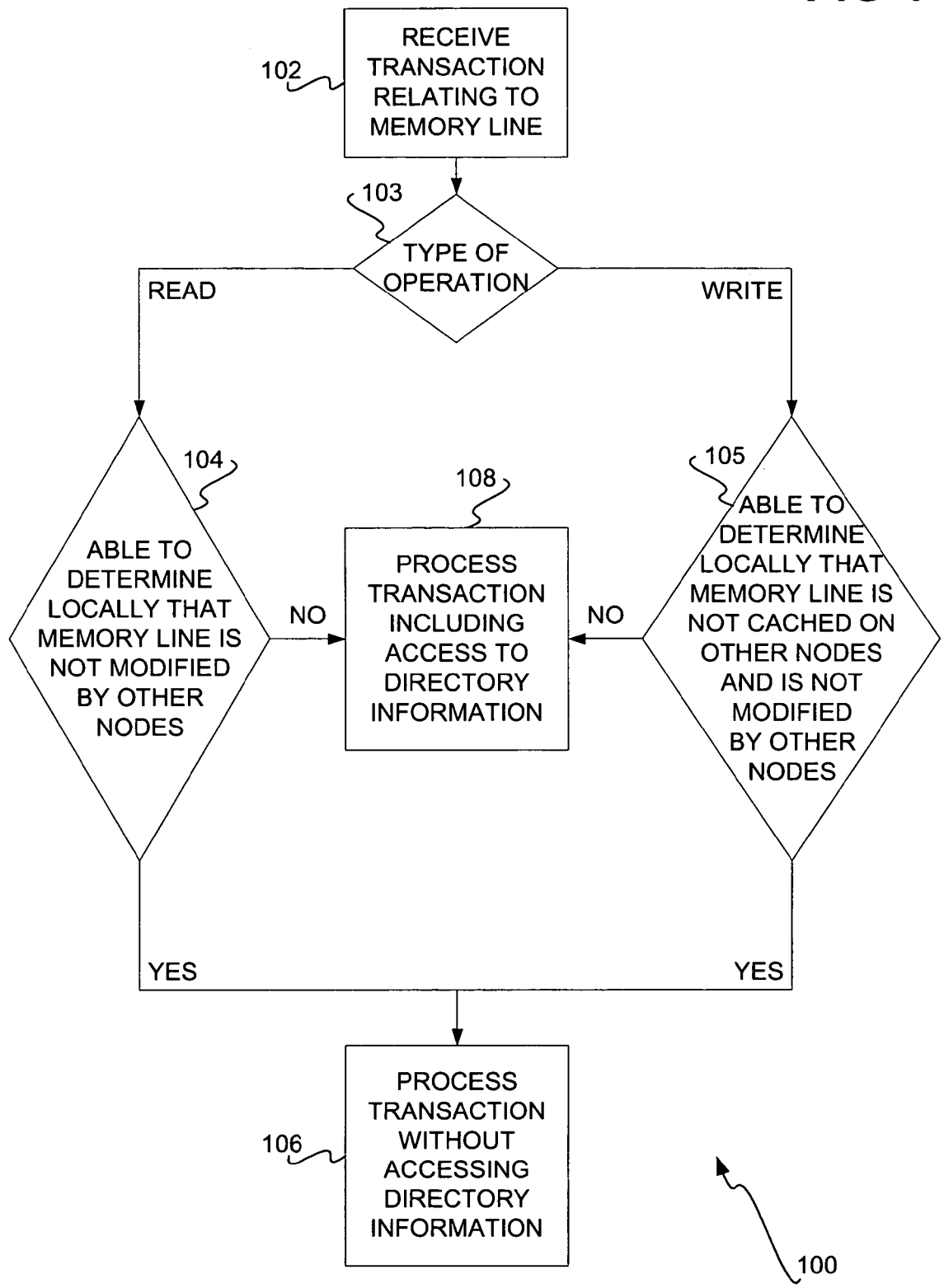
FIG. 1 is a flowchart of a method according to a preferred embodiment of the invention, and is suggested for printing on the first page of the patent.

FIG. 1 shows a method 100, according to the present invention. The method 100 is performed by a coherency controller of a node within a multi-node system. A transaction that includes a related memory line is received (102). The transaction may be a request to read from or write to the memory line, it may be a response to an earlier request, it may be to invalidate cached copies of the line, or it may be another type of transaction. The transaction is processed, such as by being converted to a set of performable actions, which when performed effect the transaction. The conversion process may be accomplished within a coherency processor, as will be described.

Prior to processing the transaction, the coherency controller determines the type of operation that the transaction is to accomplish (103). If the operation is a write operation, the coherency controller determines without a directory access whether it is able to locally determine that the memory line is not being cached by any other nodes within the system, and is not modified by any other nodes (105). If the operation is a read operation, the coherency controller similarly determines without a directory access whether it is able to locally determine that the memory line has not been modified by any other nodes within the system (104). This is accomplished by looking up whether the memory is being cached and/or has been modified by other nodes within a local region table within the coherency controller itself, as is described in more detail in subsequent sections of the detailed description, as opposed to referencing a directory, which is a multiple cycle access.

As has been described in the background, a directory stores information regarding the remote caching of local memory. The coherency controller determining of this information with no directory access speeds processing of the transaction. For instance, the coherency controller does not have to reference the information about the local memory line within the directory, so that a multiple-cycle access to the directory is not needed.

Therefore, if the coherency controller has determined locally that the memory line does not require a directory access then the coherency controller processes the transaction without accessing directory information regarding the memory line (106). However, if the coherency controller is not able to determine locally that the memory line is not being cached by any other nodes, and that the memory line is not held modified by any other nodes, then the coherency controller processes the transaction by accessing directory information regarding the memory line (108). The coherency controller processes read transactions by accessing directory information regarding the memory line if it determines locally that the memory line is being held as modified by any other nodes. The coherency controller processes write or invalidate transactions by accessing directory information regarding the memory line if it determines locally that the memory line is being cached by any other nodes.

Processing the transaction within the coherency controller can include converting the transaction to a set of actions that when performed effect the transaction. Such processing may occur within a coherency processor, such as a multiple-stage pipeline, of the coherency controller. Processing the transaction without accessing directory information regarding the memory line results in faster processing of the transaction. Put another way, having to access directory information regarding the memory line results in slower processing of the transaction.

Technical Background

Figure 2:
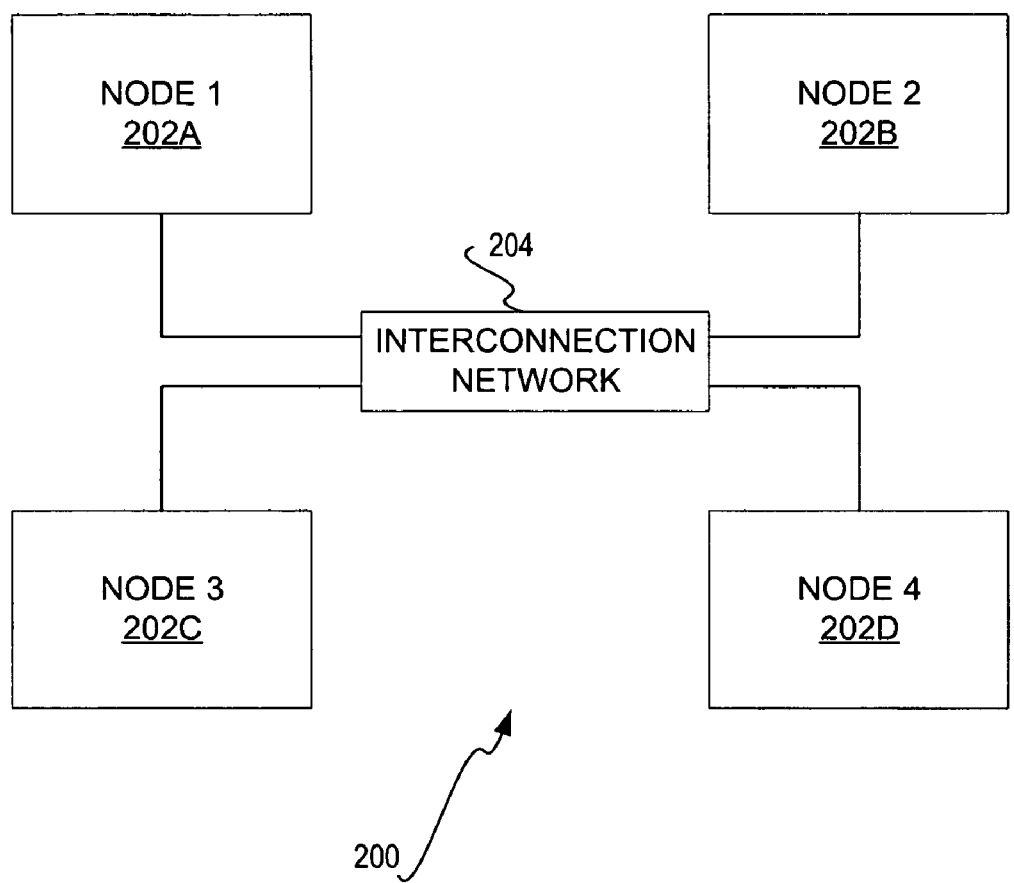
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. With most interconnection schemes, the latency to access the remote memory is greater than that of references to local memory. Thus, the system 200 can implement a non-uniform memory architecture (NUMA) in one embodiment of the invention.

Figure 3:
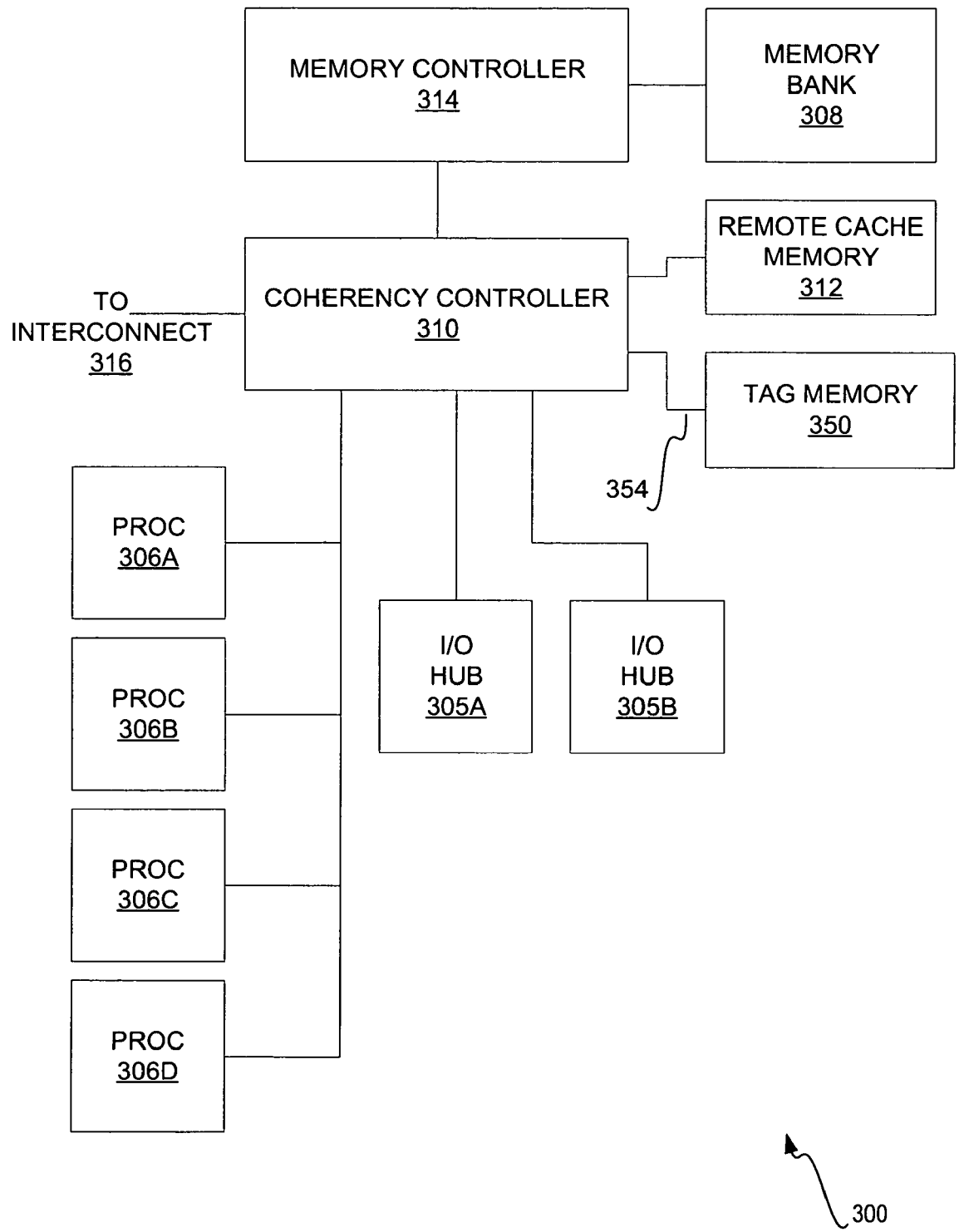
FIG. 3 is a diagram of one of the nodes of the system of FIG. 2 in more detail, according to an embodiment of the invention.

FIG. 3 shows in more detail a node 300, according to an embodiment of the invention, which can implement one or more of the nodes 202 of FIG. 2. As can be appreciated by those of ordinary skill within the art, only those components needed to implement one embodiment of the invention are shown in FIG. 3, and the node 300 may include other components as well. The node 300 has four processors 306A 306B, 306C, and 306D, collectively referred to as the processors 306. The node 300 also has two input-output (I/O) hubs 305A and 305B, used to attach peripheral controllers, and which are collectively referred to as the I/O hubs 305. The I/O hubs 305 may also generate requests for memory that must be processed by the coherency controller.

The node 300 includes a portion of system memory, referred to as the memory bank 308. The memory bank 308 represents an amount of random-access memory (RAM) local to the node. The node 300 may have more than a single bank of memory, however. The memory controller 314 manages requests to and responses from the memory bank 308. The coherency controller 310 maintains coherency for the memory bank 308. The coherency controller 310 may be an application-specific integrated circuit (ASIC) in one embodiment, as well as another combination of software and hardware. The coherency controller 310 also may have a remote cache memory 312 for managing requests and responses that relate to remote memory, which is the local memory of nodes other than the node 300 is a part. Stated another way, the memory bank 308 is local to the node 300, and is remote to nodes other than the node 300. The coherency controller 310 is preferably directly connected to the interconnection network that connects all the nodes, such as the interconnection network 204 of FIG. 2. This is indicated by the line 316, with respect to the coherency controller 310.

The coherency controller 310 interfaces with tag memory 350 via the tag busses 354. The tag memory 350 includes the directory maintaining coherency information regarding the lines of memory of the remote cache memory 312, and information relating to remote references to the memory lines of the memory bank 308. The remote caching information regarding the memory lines of the memory bank 308 may include whether any other nodes are also caching the memory lines of memory bank 308, or whether any of the other nodes have modified the memory lines of the memory bank 308. The tag memory 350, as well as the remote cache memory 312, may be external to the controller 310 or implemented in embedded dynamic random-access memory (DRAM) or embedded static random-access memory (SRAM).

There is preferably a one-to-one correspondence between all the locations within the remote cache memory 312 and the entries of the tag memory 350. That is, each cache memory location has a corresponding tag entry within the tag memory 350, where a tag entry specifically stores information regarding the cache memory location to which it corresponds. The tag memory 350 also has entries for lines in local memory. These entries are used to track the state of the local memory lines in relation to remote accesses. There may be a one-to-one correspondence between the number of tag memory entries and the number of local memory lines, or the tag memory entries may be a cache memory of the most recently local memory lines accessed by other nodes.

Figure 4:
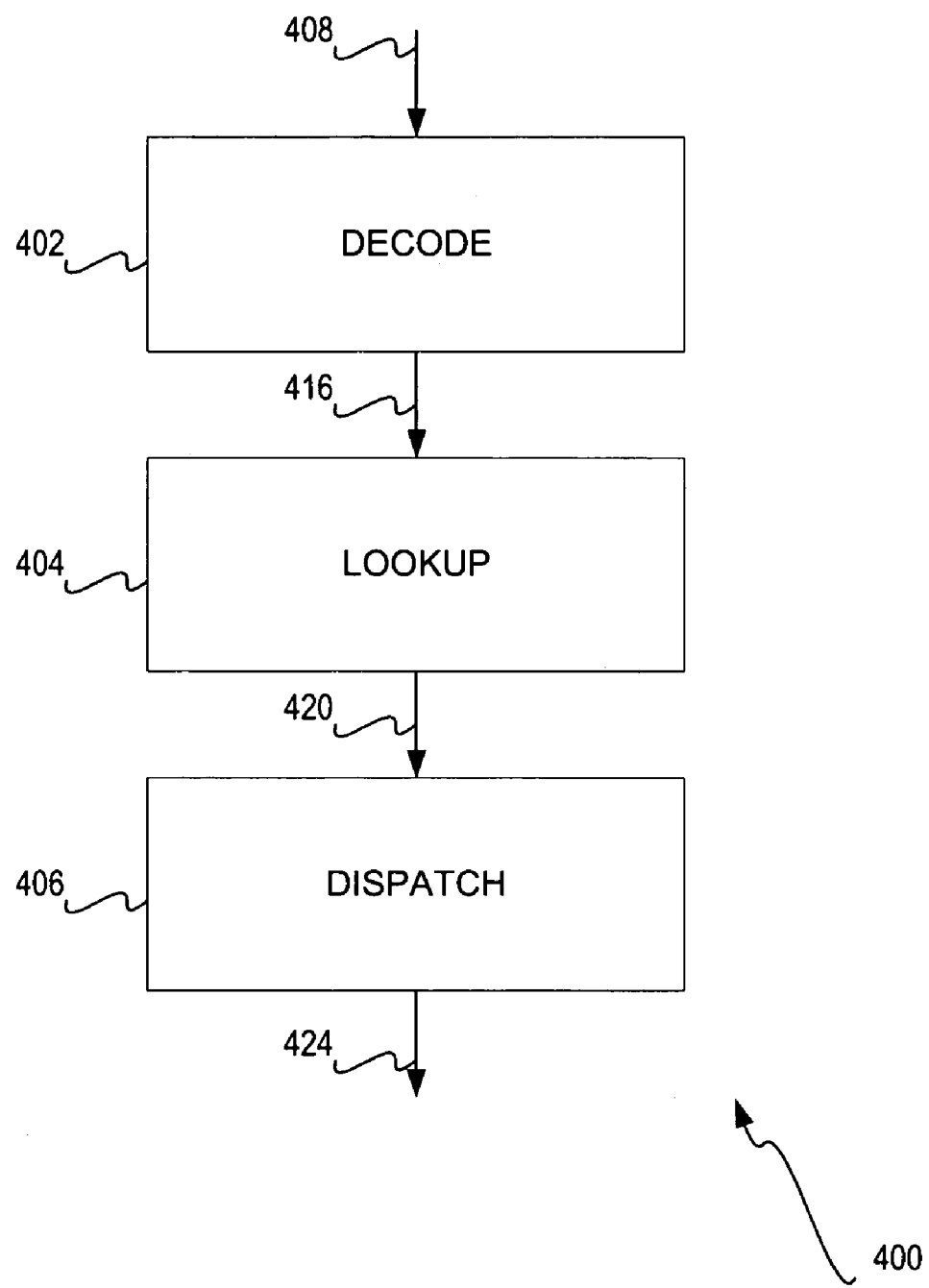
FIG. 4 is a diagram of a coherency processor, according to an embodiment of the invention.

FIG. 4 shows a coherency processor 400 that may be implemented in the coherency controller 310 of FIG. 3, according to an embodiment of the invention. The coherency processor 400 includes a decode stage 402, a lookup stage 404, and a dispatch stage 406. As can be appreciated by those of ordinary skill within the art, the coherency processor 400 may also have additional stages other than stages 402, 404, and 406 depicted in FIG. 4. The processor 400 may further be implemented as a multistage pipeline. Additionally, the decode and lookup stages 402 and 404 may occur in parallel, be implemented as a state machine, and/or be implemented with a processor and firmware. Transactions that have been arbitrated in a given order enter the decode stage 402, as indicated by the incoming arrow 408. The decode stage decodes the incoming responses or requests, target address, transaction attributes, and additional transaction information, into internal commands.

The internal commands are then input into the lookup stage 404, as indicated by the incoming arrow 416. The lookup stage 404 determines whether the line of memory being accessed has been cached or modified by other nodes. This is accomplished first by checking a local region table within the coherency controller 310 of FIG. 3 to determine if the local region table has stored this information. If the information is not stored within the local region table, then a directory external to the coherency controller 310 is accessed to determine whether the directory has stored information regarding whether the memory line has been cached or modified by other nodes. Finally, if the information is not stored in the external directory, then the remote nodes are polled to determine whether they have cached or modified the line of memory in question.

The internal commands from the decode stage 402 are input into the dispatch stage 420. The dispatch stage 420 utilizes the results of the lookup stage 404 to form the commands that when performed effect the transactions. The resulting actions can then be dispatched, as indicated by the outgoing arrow 424, for concurrent performance thereof to effect the transaction that had initially been input into the decode stage 402.

Coherency Controller Having Local Region Table

Figure 5:
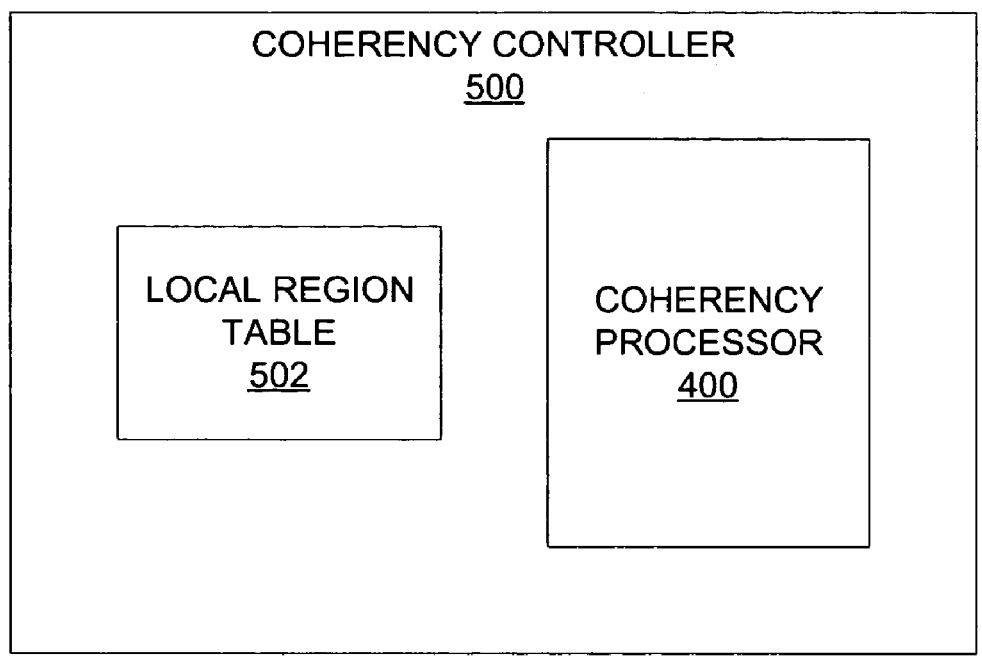
FIG. 5 is a diagram of one of the coherency controllers of the node of FIG. 3 in more detail, according to an embodiment of the invention.

FIG. 5 shows a coherency controller 500, according to an embodiment of the invention, which can implement the coherency controller 310 of FIG. 3. The controller 500 may be that which performs the method 100 of FIG. 1. The controller 500 includes a coherency processor 400 and a local region table 502. The coherency processor 400 is preferably the coherency processor 400 of FIG. 4 that has been described. The controller 500 converts received transactions to performable actions within the coherency processor 400 to effect the transactions.

As has been described, while processing transactions within the coherency processor 400, the controller 500 may have to determine information regarding the memory line to which the transaction relates. Specifically, the controller 500 may have to determine whether the memory line is or is not being cached by nodes other than the node of which the controller 500 is a part, and whether the memory lines have or have not been modified by such nodes. This information is typically stored in tag memory, such as by one or more flags corresponding to whether the memory line has been remotely cached or has not been remotely cached, and to whether the memory line has been remotely modified or has not been remotely modified. The tag memory, such as the tag memory 350 of FIG. 3, is a high-latency memory. Accessing such information slows processing of the transactions.

The information can be stored and updated within the tag memory in a number of different ways. For example, in one embodiment, the local memory of a node may be divided into 1,024 different regions. The local region table 502 may track three different count values for each region: the number of lines in the region that are being cached by other nodes; the number of lines in the region that have been modified by other nodes; and, the number of lines in the region that, as stored by the home node, are valid. A memory line is valid whether the contents of the memory line as stored by the home node reflect the proper and current value of the memory line, and thus has not been modified and held in a processor cache. As memory lines are modified or cached by other nodes, the other nodes report back to the home node for the memory lines, and the home node correspondingly increases or decreases these count values.

In another embodiment of the invention, a flag, such as a bit vector, is used for each track to track whether any of the memory lines within the region have been cached by other nodes, such as by being checked out by the operating system (OS). If the flag has been set, then this means that one or more of the memory lines within the region are being cached by other nodes. As memory lines are cached by other nodes, the nodes report back to the home node for the memory lines, and the home node correspondingly sets or clears the flag.

That a node is not caching a memory line means that the node has no cached copy of the memory line. That a node has not modified a memory line means that the node may be caching the memory line, but that the cached copy of the memory line has not been modified by the node, such that the data matches that of data in memory. The local region table 502 is thus included in the controller 500 so that the controller 500 does not have to access such memory line-related information in high-latency tag memory. The controller 500 may access an entry within the local region table 502 to determine whether the line of local memory to which a received transaction relates is not being cached by other nodes, or has not been modified by other nodes. Because the local region table 502 is smaller in size than the tag memory, the local region table 502 may have an entry for each section of memory, where each section includes a number of local memory lines.

Therefore, the entry that the controller 500 accesses within the local region table 502 in actuality may indicate whether any memory line within a section of memory, including the memory line in question, has not been cached or modified by other nodes. If this verification indicates that no memory line within the relevant memory section has been cached or modified by other nodes, then the controller 500 may process the transaction to which the memory line in question relates without having to access such information within the tag memory. However, if the verification indicates that one or more memory lines within the relevant memory section have been cached or modified by other nodes, then the controller 500 nevertheless accesses the tag memory to process the transaction.

This is the case even where the memory line in question has not been cached or modified by other nodes, because the local region table 502 does not store such information down to a memory line granularity. That is, the controller 500 is able to determine by referencing the local region table 502 whether all memory lines within a given memory section have not been cached or modified by other nodes. The controller 500 is not able to determine whether a particular memory line in the given memory section has not been cached or modified by other nodes. In one embodiment, each entry within the local region table 502 corresponding to a memory section includes two count values. There is one count value that indicates the number of memory lines within the memory section that are being cached by other nodes, and another count value that indicates the number of memory lines within the memory section that have been modified by other nodes.

The controller 500 may utilize some or all of this information to determine whether a given transaction may be locally processed. For instance, for a read transaction the controller 500 may only have to verify that the memory line in question has not been modified by other nodes. That is, for a read transaction the controller 500 may not have to verify that the memory line in question is being cached by other nodes. As another example, for a write transaction the controller 500 may have to verify whether the memory line in question is being cached by other nodes, so that the controller 500 can indicate to the other nodes that its cached copy of the memory line is now obsolete. Alternative embodiments may have the processors attached directly to the coherency controller instead of using a common bus where transactions can be examined. In this case a flag may be used in the local region table to indicate if any of the processors have a modified version of the line that allow reads to be processed without a directory access.

Specific Embodiment of Local Region Table of Controller

FIG. 6 shows the local region table 502 of the controller 500 of FIG. 5, according to one embodiment of the invention. The local region table 502 has two types of entries. The entries 606 each have two count values, a remote count value 602, and an invalid count value 604. The entries 612 each have two flags, a hit to home flag 608, and a none gone flag 610. In one specific embodiment, there can be 2,000 of the entries 606, and 256 of the entries 612, for instance. That is, in one embodiment, there are more of the entries 606 than the entries 612. In an alternative embodiment there may be a one-to-one correspondence between the number of entries 606 and the number of entries 612. In this embodiment the entries 612 may be replaced by combinatorial logic, as can be appreciated by those of ordinary skill within the art.

Each of the entries 606 tracks macro cache memory line state for a block of contiguous physical memory. The remote count value 602 tracks the number of local memory cache memory lines that are being cached by other, remote nodes, and not just by the home, local node, whereas the invalid count value 604 tracks the number of local memory lines that have been modified outside of the home node. Thus, the number of lines not home is tracked with the remote count value 602, whereas the number of lines that have been remotely modified is tracked with the invalid count value 604.

As a local cache memory line changes state from the home state to a remote shared state or a remote modified state, the remote count value 602 is increased. The remote shared state indicates that the line has been read by a remote component, whereas the remote modified state indicates that the memory line has been accessed by a remote component for modification. If the line state changes from either the remote shared state or the home state to the remote modified state, the invalid count value 604 is also increased. As a local cache memory line changes from either the remote shared state or the remote modified state to the home state, the remote count value 602 is correspondingly decreased. If the line changes from the remote modified state to the home state or the remote shared state, then the invalid count value 604 is decreased.

The entries 612 each hold the flags 608 and 610 for one of the entries 606 of the local region table 502. The entries 612 may also each include one or more parity or error-correcting code (ECC) bits for error-checking purposes, but such bits are not depicted in FIG. 6. The hit to home flag 608 is set to one when all the cache memory lines for a region of memory, or memory section, are home, such that the associated remote count value 602 is zero. If the hit to home flag 608 is set for a memory section, than any local access to this memory section does not require external lookup. The none gone flag 610 is set to one when all the cache memory lines for a section of memory are either at the home state or the remote shared state, such that the associated invalid count value 604 is zero. If the none gone flag 610 is set for a memory section, then any home read access to this memory section does not require external lookup.

Advantages over the Prior Art

Embodiments of the invention allow for advantages over the prior art. The large majority of local memory lines to which transactions relate are likely not cached or modified by remote nodes. Therefore, inclusion of a local region table within a controller of the local node to quickly assess such information means that the controller will not likely have to access this information regarding a given local memory line in the larger, slower tag memory. This means that for the large majority of transactions, the controller can more quickly process such transactions than if it had to access tag directory information. Thus, inclusion of the local region table increases performance of the multi-node system of which the local node is a part.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has a single coherency controller with a single pipeline per controller. However, more controllers or pipelines may also be used to implement a system in accordance with the invention. Accordingly, the scope of protection of this invention is limited only by the following claims and their equivalents.

We claim:

1. A method for performance by a coherency controller of a node, comprising:
    receiving a transaction relating to a line of local memory of the node;
    determining locally within the controller that the line of local memory is one or more of not being cached by any other node, and has not been modified by any other node, by looking up two count values within an entry of a table within the coherency controller corresponding to a section of the local memory including the line of local memory,
        a first count value corresponding to a number of lines within the section of local memory being cached by other nodes, and a second count value corresponding to a number of lines within the section of the local memory having been modified by other nodes;
    in response to determining locally within the controller that the line of the local memory is one or more of not being cached by any other node, and has not been modified by any other node,
        processing the transaction by the coherency controller without accessing information regarding the line of local memory in a tag directory associated with the local memory.

2. The method of claim 1, further comprising, otherwise, processing the transaction by the coherency controller such that the coherency controller accesses information regarding the line of local memory in the tag directory.

3. The method of claim 2, wherein accessing information regarding the line of local memory in the tag directory results in slower processing of the transaction than if information regarding the line of local memory in the tag directory were not accessed.

4. The method of claim 1, wherein determining locally within the controller that the line of local memory is one or more of not being cached by any other node, and has not been modified by any other node, further comprises determining from a flag within the entry in the table whether an operating system (OS) has checked out lines within the section of local memory.

5. The method of claim 1, wherein processing the transaction by the coherency controller comprises processing the transaction by a coherency processor of the coherency controller.

6. The method of claim 1, wherein processing the transaction without accessing information regarding the line of memory in the tag directory results in faster processing of the transaction than if information regarding the line of memory in the tag directory were accessed.

7. A node of a multi-node system comprising:
    one or more processors;
    local random-access memory (RAM) for the processor(s);
    at least one memory controller to process memory operations relative to the local RAM;
    at least one coherency controller to process transactions relative to the local RAM; and,
    a local region table within each coherency controller storing access information regarding the local RAM by other nodes of the multi-node system so that the coherency controller is able to process the transactions relative to the local RAM without accessing tag directory information associated with the local RAM,
    wherein the local region table has a plurality of entries corresponding to sections of the local RAM, each entry including a first count value tracking a number of lines of the section of the local RAM being cached by the other nodes and a second count value tracking a number of lines of the section of the local RAM having been modified by the other nodes.

8. The node of claim 7, further comprising a coherency processor within the coherency controller within which the transactions are processed.

9. The node of claim 7, further comprising a tag directory within which the tag directory information is stored.

10. The node of claim 9, further comprising a tag bus connecting the coherency controller to the tag directory.

11. The node of claim 9, wherein the coherency controller accesses the local regional table with less latency than the coherency controller accesses the tag directory.

12. The node of claim 7, wherein the local region table has a plurality of flags corresponding to sections of the local RAM, each flag indicating whether another node has checked out lines within the section of the local RAM.

13. The node of claim 7, wherein the coherency controller comprises an application-specific integrated circuit (ASIC).

14. A coherency controller for a node of a system to process transactions relative to at least a portion of memory of the node, comprising:

a coherency processor within which transactions are converted into performable actions to effect the transactions relative to at least the portion of the memory of the node; and, a local region table storing access information regarding at least the portion of the memory of the node by other nodes of the system so that the coherency controller may be able to convert the transactions within the pipeline without accessing tag directory information associated with the memory of the nodes, wherein the local region table has a plurality of entries corresponding to sections of at least the portion of the memory of the node, each entry including a first count value tracking a number of lines of the section cached by the other nodes and a second count value tracking a number of lines of the section having been modified by the other nodes.

15. The controller of claim 14, wherein the controller comprises an application-specific integrated circuit (ASIC).

* * * * *